US010012266B1

(12) United States Patent
Moratz

(10) Patent No.: US 10,012,266 B1
(45) Date of Patent: Jul. 3, 2018

(54) BALL BEARING WITH CAGE HAVING RATTLE REDUCTION FEATURE AND METHOD THEREOF

(71) Applicant: Schaeffler Technologies AG & Co. KG, Herzogenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/404,670

(22) Filed: Jan. 12, 2017

(51) Int. Cl.
*F16C 33/38* (2006.01)
*F16C 19/16* (2006.01)

(52) U.S. Cl.
CPC ........ *F16C 33/3806* (2013.01); *F16C 19/163* (2013.01); *F16C 2300/20* (2013.01)

(58) Field of Classification Search
CPC .................................................. F16C 33/3806
See application file for complete search history.

(56) References Cited

U.S. PATENT DOCUMENTS

| 4,324,444 A | | 4/1982 | Bucynski et al. | |
| 5,069,560 A | * | 12/1991 | Niedermeier | ....... F16C 33/3806 384/486 |
| 5,102,242 A | * | 4/1992 | Hussblein | ............... F16C 19/06 384/516 |
| 5,522,667 A | * | 6/1996 | Miyake | ................. F16C 19/163 384/492 |
| 5,553,949 A | * | 9/1996 | Fukuwaka | ............... F16C 19/06 384/470 |
| 6,957,919 B2 | * | 10/2005 | Kern | ..................... F16C 19/182 384/504 |

FOREIGN PATENT DOCUMENTS

| JP | H0647696 U | * | 6/1994 | .......... F16C 33/3806 |
| JP | 3360927 B2 | * | 1/2003 | .......... F16C 33/3806 |
| JP | 2005133818 A | * | 5/2005 | .......... F16C 33/3806 |
| JP | 2014020506 A | * | 2/2014 | .......... F16C 33/3806 |

OTHER PUBLICATIONS

Machine translation of JP2005-133818.*

* cited by examiner

Primary Examiner — Thomas R Hannon

(57) ABSTRACT

A bearing, including: an axis of rotation; an outer ring; an inner ring located radially inward of the outer ring; a cage including at least one protrusion extending in a radial direction; a ball disposed in the cage; and at least one recess. The outer ring includes a recess included in the at least one recess and a protrusion included in the at least one protrusion is located in the recess. The inner ring includes a recess included in the at least one recess and a protrusion included in the at least one protrusion is located in the recess.

19 Claims, 12 Drawing Sheets

BALL BEARING WITH CAGE HAVING RATTLE REDUCTION FEATURE AND METHOD THEREOF

TECHNICAL FIELD

The present disclosure relates to a ball bearing with a cage having at least one protrusion extending radially inwardly or outwardly into a recess in the inner or outer ring of the ball bearing. The protrusion and recess interface to block displacement of the cage with respect to the inner or outer ring, in particular during low speed operation.

BACKGROUND

FIG. 7 is a partial cross-sectional view of prior art angular contact bearing 600 with outer ring guidance. Bearing 600 includes outer ring 602, inner ring 604, cage 606, and ball 608 axially disposed within cage 606. Cage 606 is guided by contact with portion 610 of cage 606 with land surface 612 of outer ring 602. Cage rattle can occur in bearing 600 during operation at low speed. For example, cage rattle in bearing 600 is caused by a rocking motion of the cage, enabled by the clearance between ball 608 and cage 606 and axial displacement of cage 606. The rocking motion results in contact of cage 606 with ring 602. Cage rattle also can occur with spindle bearings, for example in machine tools. Cage rattle is a problem in applications in which silent operation of a ball bearing is required at both high and low speeds.

SUMMARY

According to aspects illustrated herein, there is provided a bearing, including: an axis of rotation; an outer ring; an inner ring located radially inward of the outer ring; a cage including at least one protrusion extending in a radial direction; a ball disposed in the cage; and at least one recess. The outer ring includes a recess included in the at least one recess and a protrusion included in the at least one protrusion is located in the recess. The inner ring includes a recess included in the at least one recess and a protrusion included in the at least one protrusion is located in the recess.

According to aspects illustrated herein, there is provided a ball bearing, including: an axis of rotation; an outer ring including a recess; an inner ring located radially inward of the outer ring; a ball bearing cage radially disposed between the inner and outer rings and including a first body portion including a protrusion extending radially outward into the recess and a second body portion; and a ball axially disposed between the first and second body portions.

According to aspects illustrated herein, there is provided a method of reducing rattle in a bearing including an outer ring, an inner ring located radially inward of the outer ring, a cage located radially between the inner and outer rings, and a ball axially located within the cage, including: rotating one of the inner or outer races with respect to the other or the inner or outer races; engaging a wall of a protrusion, extending radially from the cage, with a wall forming a recess in the inner or outer ring; and blocking, through the engagement of the wall of the protrusion with the wall forming the recess, displacement of the cage with respect to the inner or outer ring.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
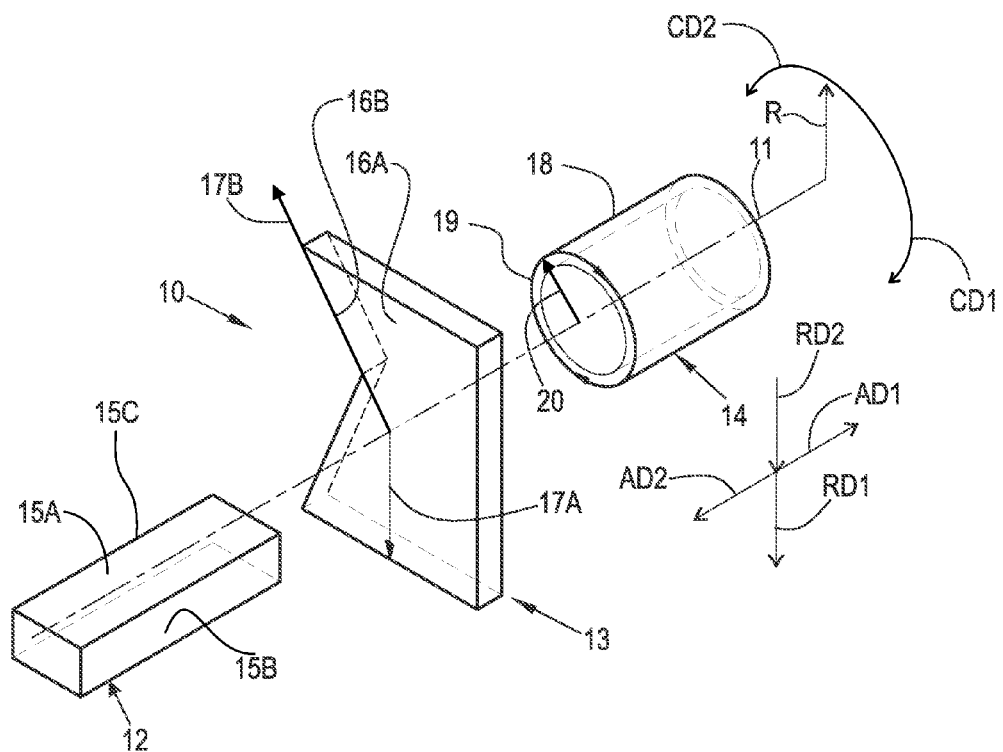
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11, but off-set from surface 15A in direction RD1, also is an axial surface. An axial edge is formed by an edge, such as edge 15C, parallel to axis 11. A radial surface, such as surface 16A of object 13, is formed by a plane orthogonal to axis 11 and co-linear with a radius, for example, radius 17A. A radial edge is co-linear with a radius of axis 11. For example, edge 16B is co-linear with radius 17B. Surface 18 of object 14 forms a circumferential, or cylindrical, surface. For example, surface 18 forms radially outer circumference 19 of object 14. Radially outer circumference 19 is defined by radius 20.

Axial movement is in direction axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 2A:
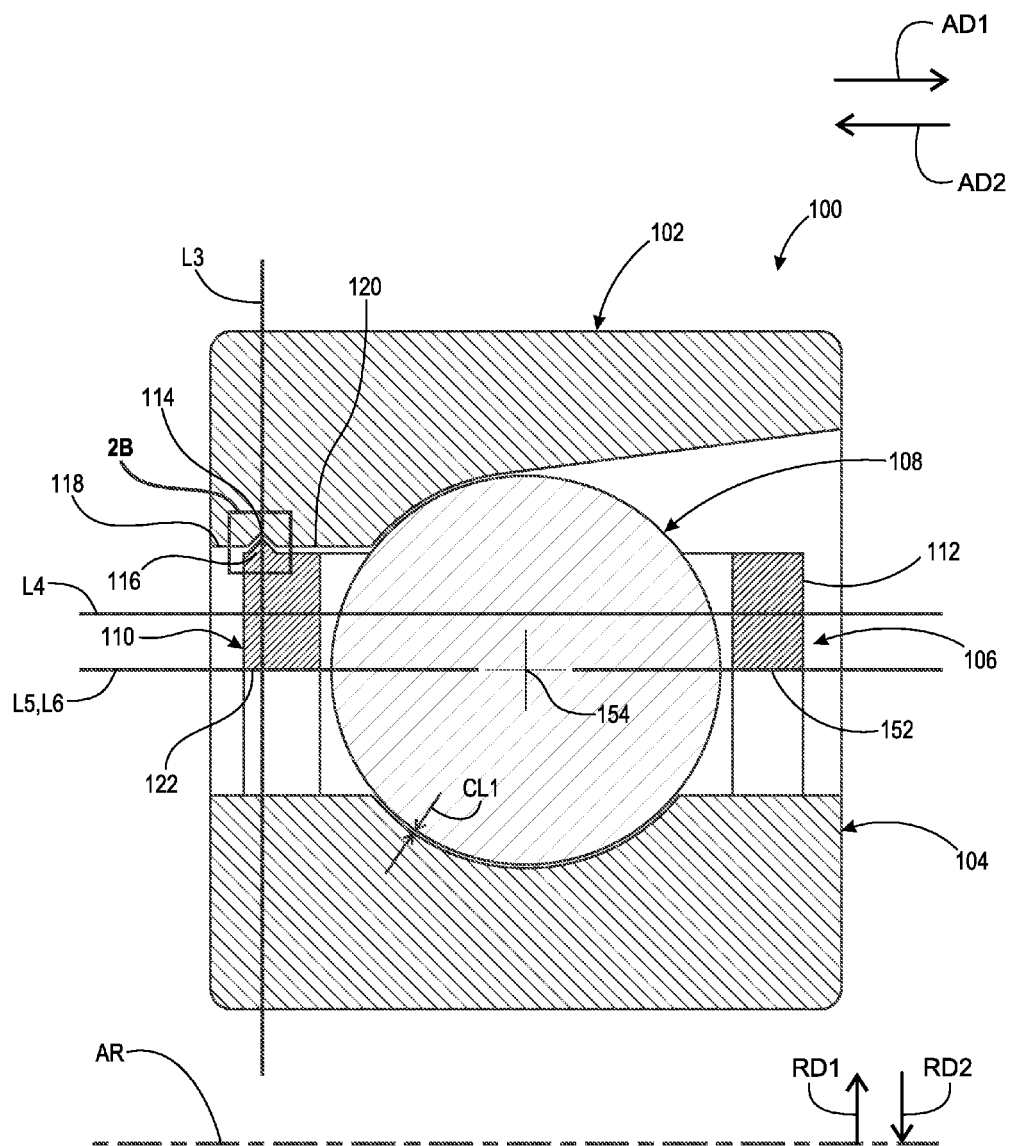
FIG. 2A is a partial cross-sectional view of a ball bearing with a cage having ring guidance.

FIG. 2A is a partial cross-sectional view of ball bearing 100 with a cage having ring guidance.

Figure 2B:
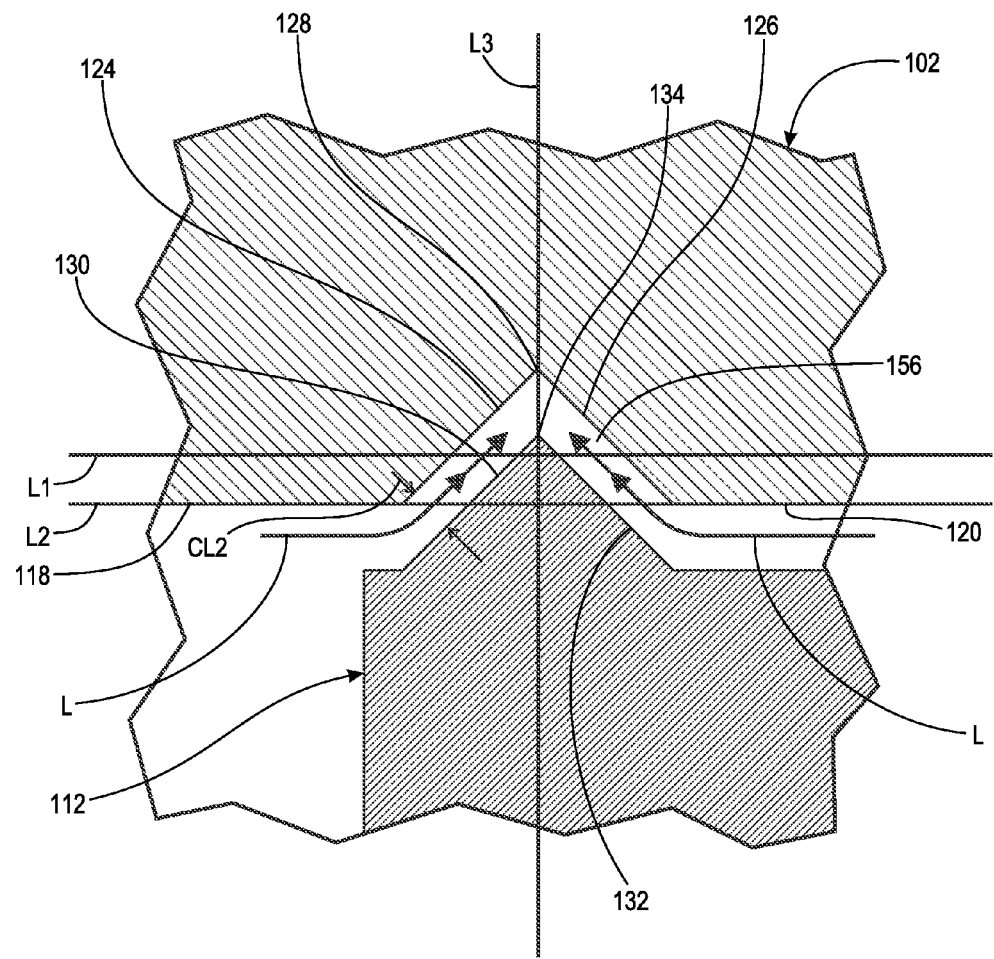
FIG. 2B is a detail of area 2B in FIG. 2A.

FIG. 2B is a detail of area 2B in FIG. 2A. The following should be viewed in light of FIGS. 2A and 2B. Ball bearing 100 includes: axis of rotation AR; outer ring 102; inner ring 104 located radially inward of outer ring 102; cage 106; and at least one ball 108. FIG. 2A is a cross-section formed by a plane co-linear with axis AR. Cage 106 and ball 108 are radially located, or disposed, between rings 102 and 104. Ball 108 is disposed in cage 106. For example, ball 108 is axially disposed between body portions 110 and 112 of cage 106. In the example of FIGS. 2A and 2B: outer ring 102 includes radially outwardly extending recess 114; and cage 106 includes radially outwardly extending protrusion 116, located, at least in part, in recess 114. For example, protrusion 116 on body portion 110 extends into recess 114.

Line L1, parallel to axis of rotation AR passes through recess 114 and protrusion 116. In an example embodiment: ring 102 includes surfaces 118 and 120 facing radially inward; and line L2, parallel to axis of rotation AR, is co-linear with surfaces 118 and 120 and passes through protrusion 116. Line L3, orthogonal to axis of rotation AR, passes through in sequence: ring 104; radially innermost surface 122 of portion 110; protrusion 116; and ring 102.

In the example of FIGS. 2A and 2B, recess 114 and protrusion 116 have matching substantially triangular shapes. For example: recess 114 is formed or bounded, at least in part, by wall 124 slanting in axial direction AD1 and by wall 126 slanting in axial direction AD2, opposite axial direction AD1. In an example embodiment, walls 124 and 126 meet at point 128. For example: protrusion 116 is formed or bounded, at least in part, by wall 130 slanting in axial direction AD1 and by wall 132 slanting in axial direction AD2. In an example embodiment, walls 130 and 132 meet at point 134. Thus, in direction AD1, line L1 passes through in sequence: wall 124, wall 130, wall 132, and wall 126.

Figure 3A:
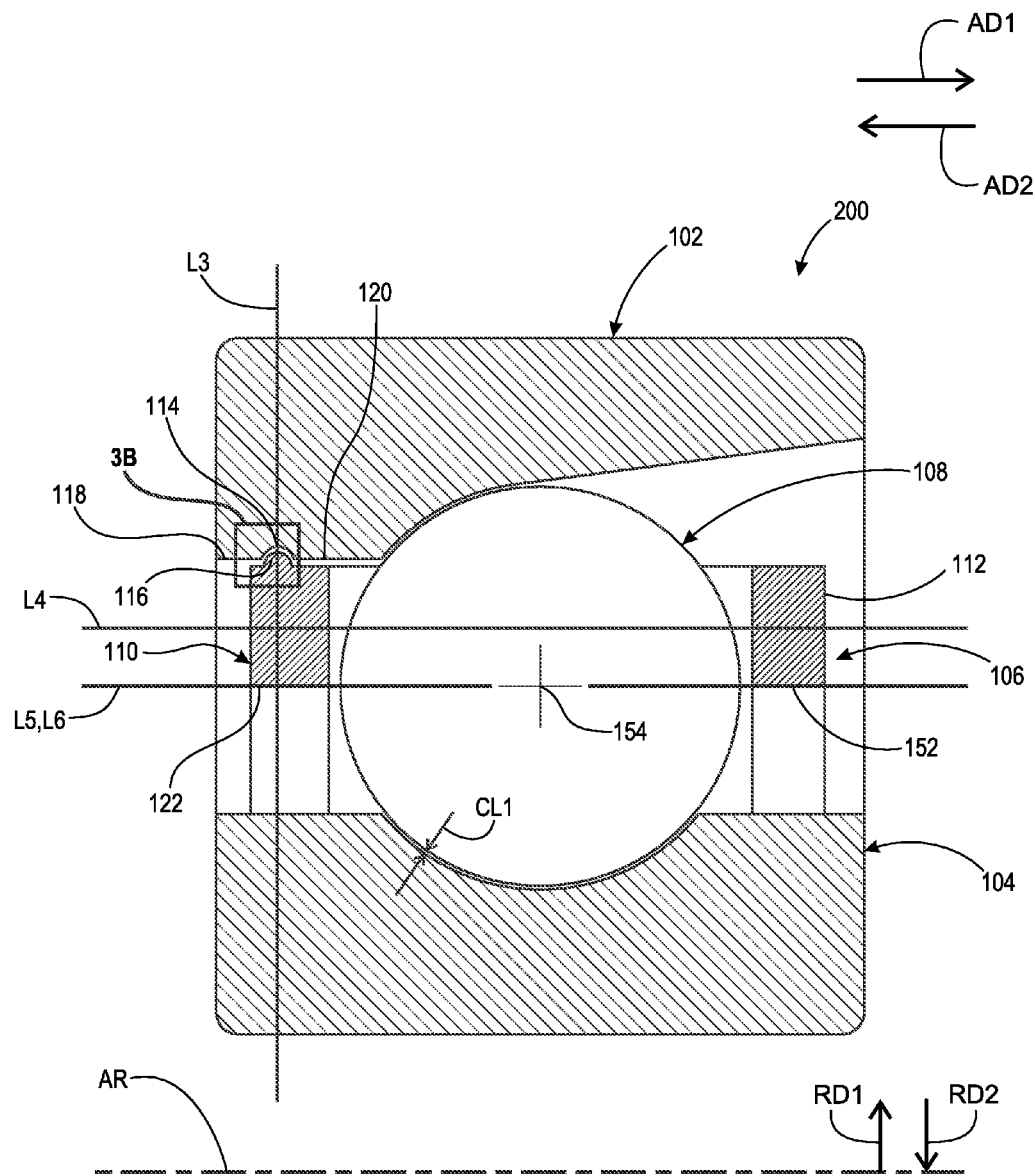
FIG. 3A is a partial cross-sectional view of a ball bearing with a cage having ring guidance.

FIG. 3A is a partial cross-sectional view of ball bearing 200 with a cage having ring guidance.

Figure 3B:
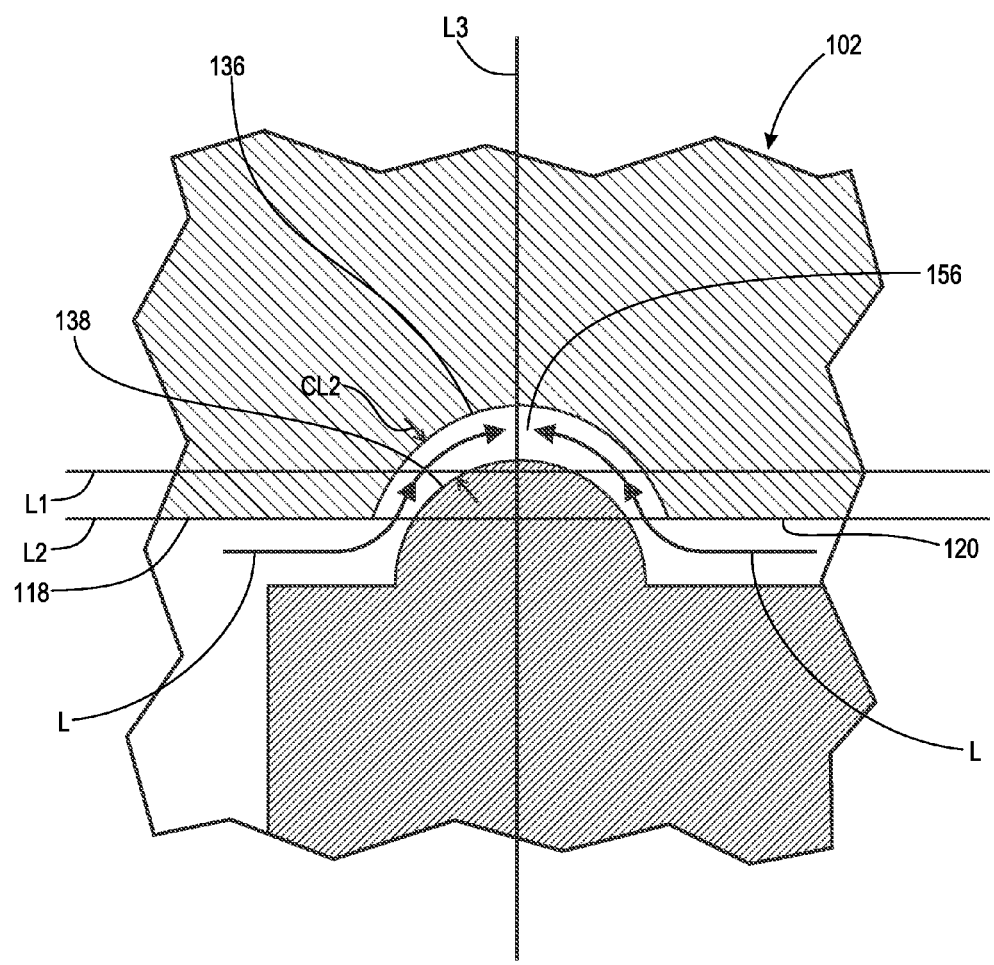
FIG. 3B is a detail of area 3B in FIG. 3A.

FIG. 3B is a detail of area 3B in FIG. 3A. The following should be viewed in light of FIGS. 2A through 3B. FIG. 3A is a cross-section formed by a plane co-linear with axis AR. The discussion for ball bearing 100 in FIGS. 2A and 2B is applicable to ball bearing 200 except as noted. The respective shapes of recess 114 and protrusion 116 for bearing 200 differ from those for bearing 100. For bearing 200, recess 114 is bounded by, or formed by, rounded wall 136 defined by a single smooth curve, and protrusion 116 includes rounded wall 138 also defined by a single smooth curve. In an example embodiment, walls 136 and 138 mirror each other. In an example embodiment, walls 136 and 13 are portions of respective circles. Lines L1 and L3 pass through walls 136 and 138.

Figure 4A:
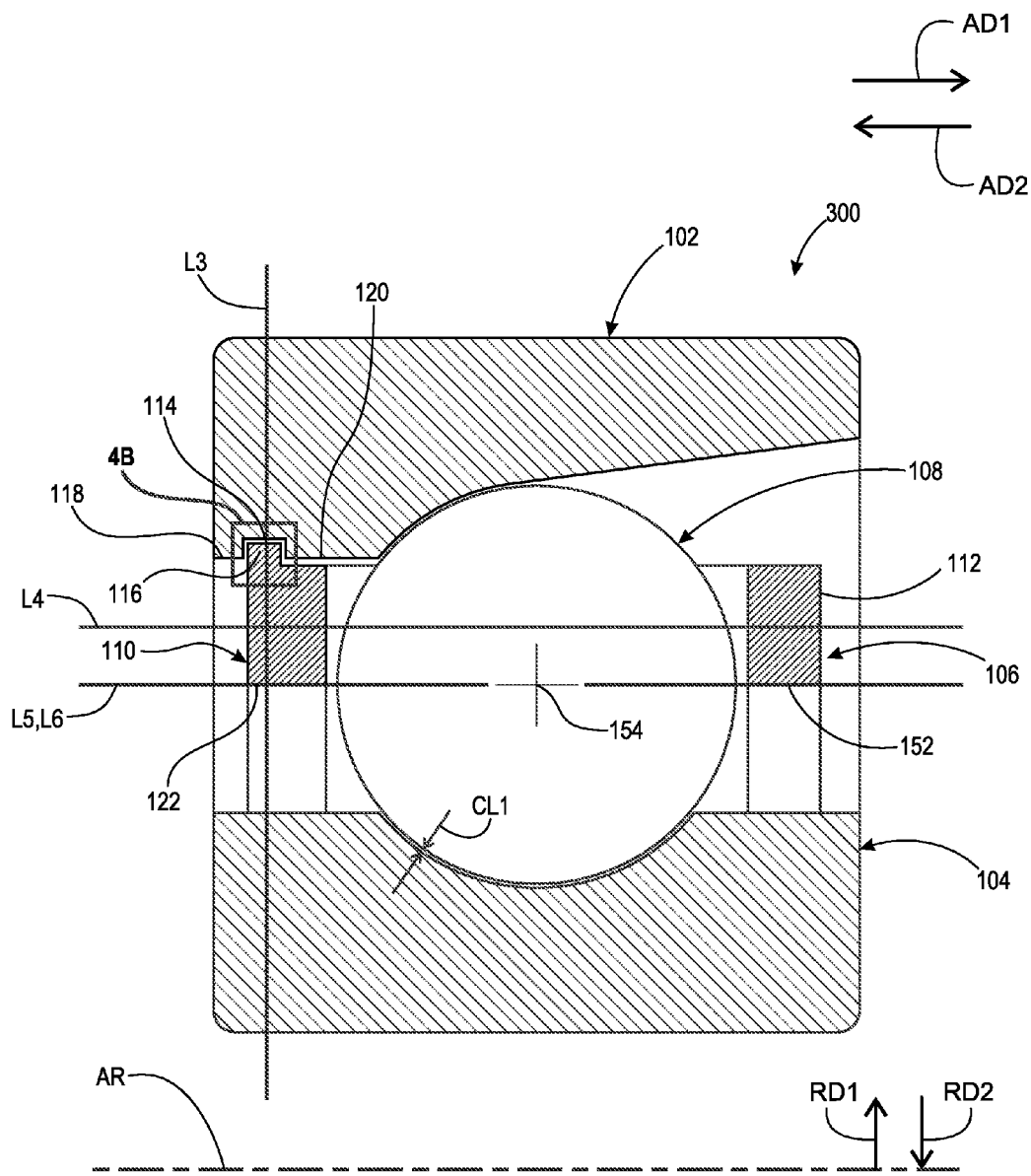
FIG. 4A is a partial cross-sectional view of a ball bearing with a cage having ring guidance.

FIG. 4A is a partial cross-sectional view of ball bearing 300 with a cage having ring guidance.

Figure 4B:
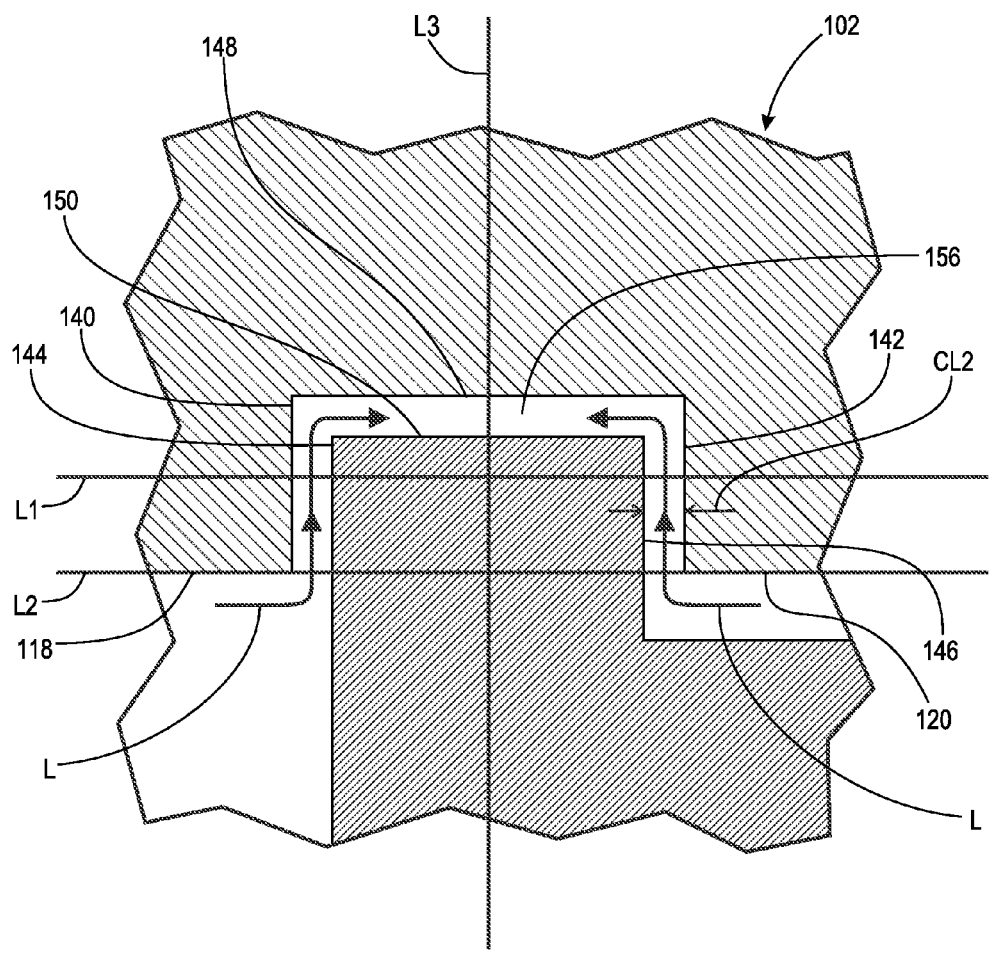
FIG. 4B is a detail of area 4B in FIG. 4A.

FIG. 4B is a detail of area 4B in FIG. 4A. The following should be viewed in light of FIGS. 2A through 4B. FIG. 4A is a cross-section formed by a plane co-linear with axis AR. The discussion for ball bearing 100 in FIG. 2 is applicable to ball bearing 300 except as noted. The respective shapes of recess 114 and protrusion 116 for bearing 300 differ from those for bearing 100. For bearing 300: recess 114 is formed, at least in part, radial walls 140 and 142 orthogonal to axis AR; and, protrusion 116 includes radial walls 144 and 146 orthogonal to axis AR. Line L1 passes through, in sequence, walls 140, 144, 146, and 142. In an example embodiment, circumferential wall 148 connects walls 140 and 142, and circumferential wall 150 connects walls 144 and 146. Line L3 passes through walls 148 and 150.

Figure 5A:
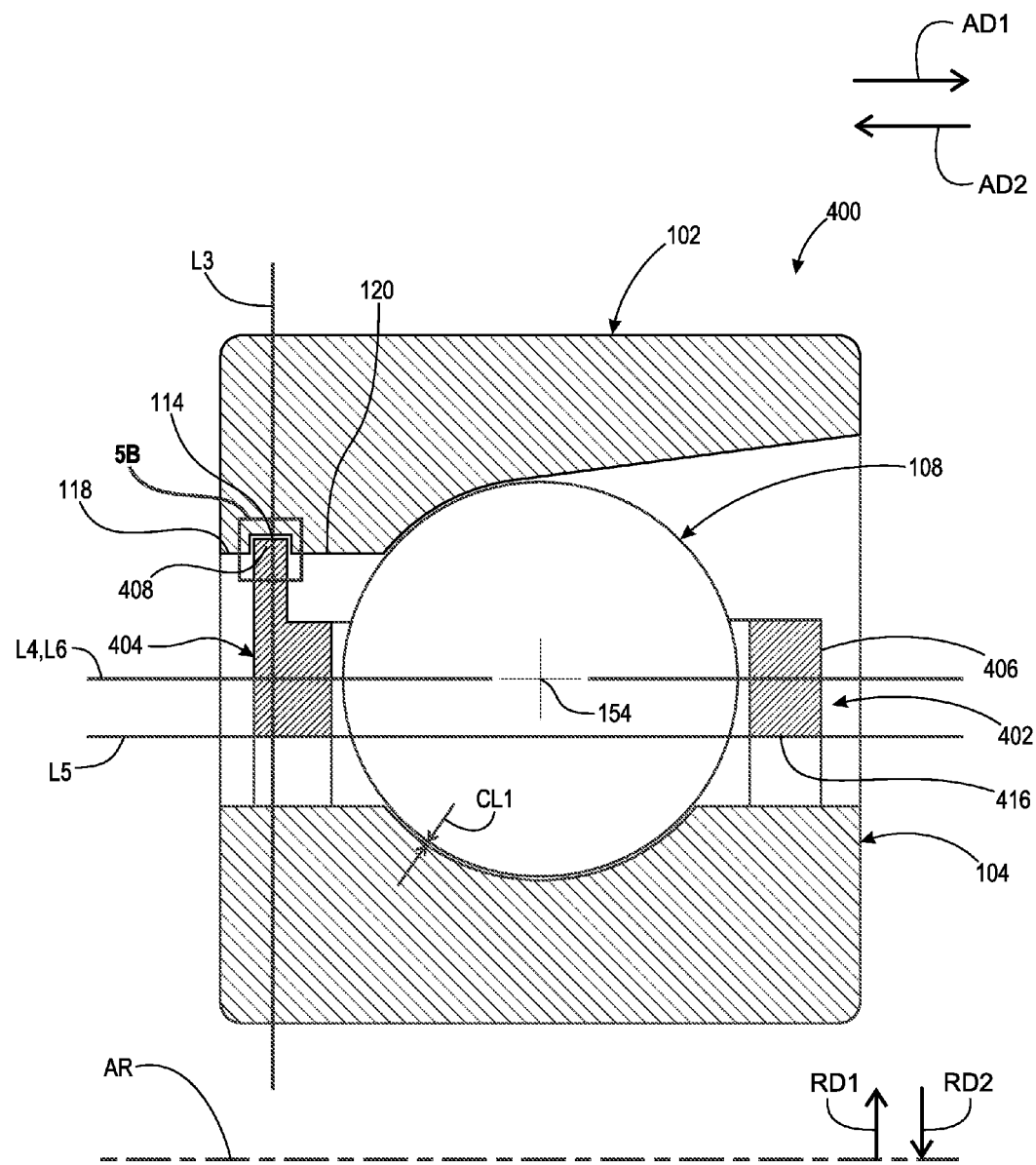
FIG. 5A is a partial cross-sectional view of a ball bearing with a ball-piloted cage.

FIG. 5A is a partial cross-sectional view of ball bearing 400 with a ball-piloted cage.

Figure 5B:
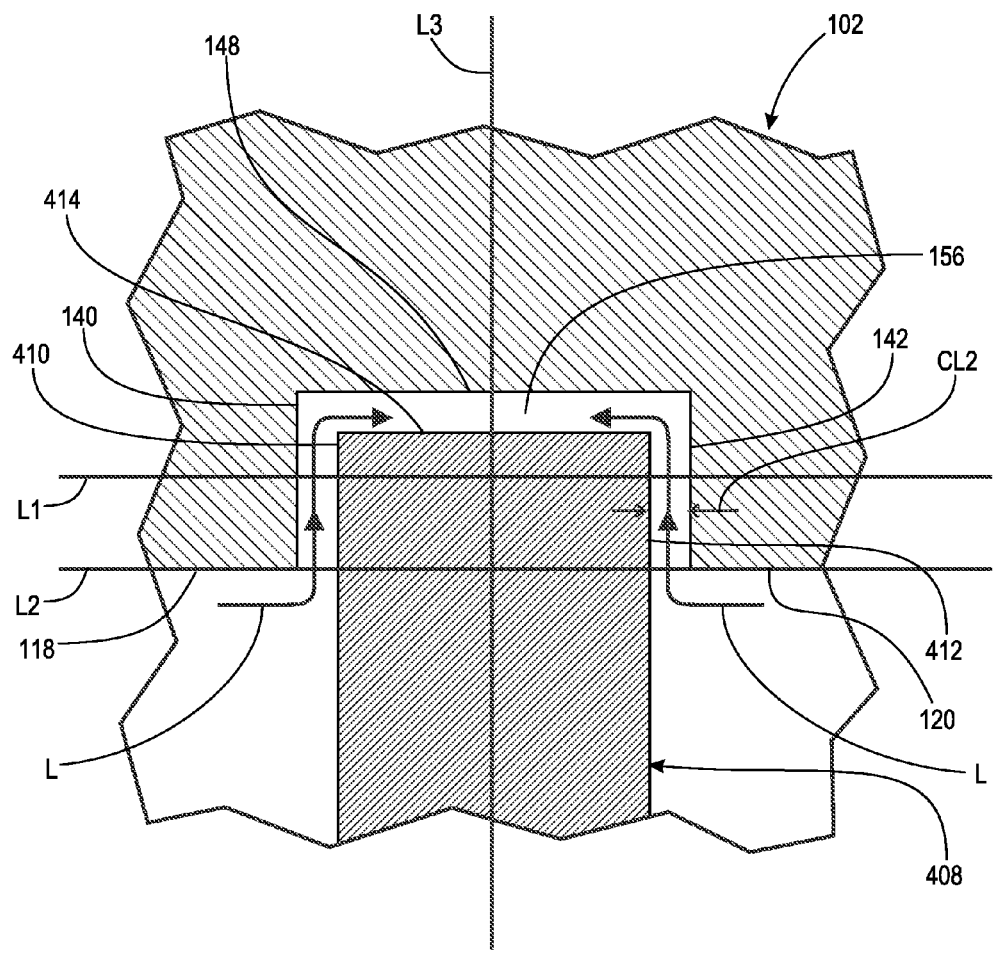
FIG. 5B is a detail of area 5B in FIG. 5A.

FIG. 5B is a detail of area 5B in FIG. 5A. The following should be viewed in light of FIGS. 2A through 5B. FIG. 5A is a cross-section formed by a plane co-linear with axis AR. Bearing 400 includes rings 102 and 104, and ball guided cage 402 with portions 404 and 406. Ball 108 is axially disposed between portions 404 and 406. Outer ring 102 includes recess 114. Protrusion 408, extending radially outward from portion 404, is radially longer than protrusion 116 for bearing 300. In the example of FIGS. 5A and 5B: recess 114 includes walls 140, 142 and 148; and protrusion 408 includes radial walls 410 and 412 and circumferential wall 414 connecting walls 410 and 412. However, it should be understood that other shapes, such as those shown in FIGS. 2A and 2B, or 3A and 3B are possible for recess 114 and protrusion 408 in FIGS. 5A and 5B. Line L1 passes through, in sequence, walls 140, 410, 412 and 142. Line L3 passes through walls 414 and 148.

Figure 6A:
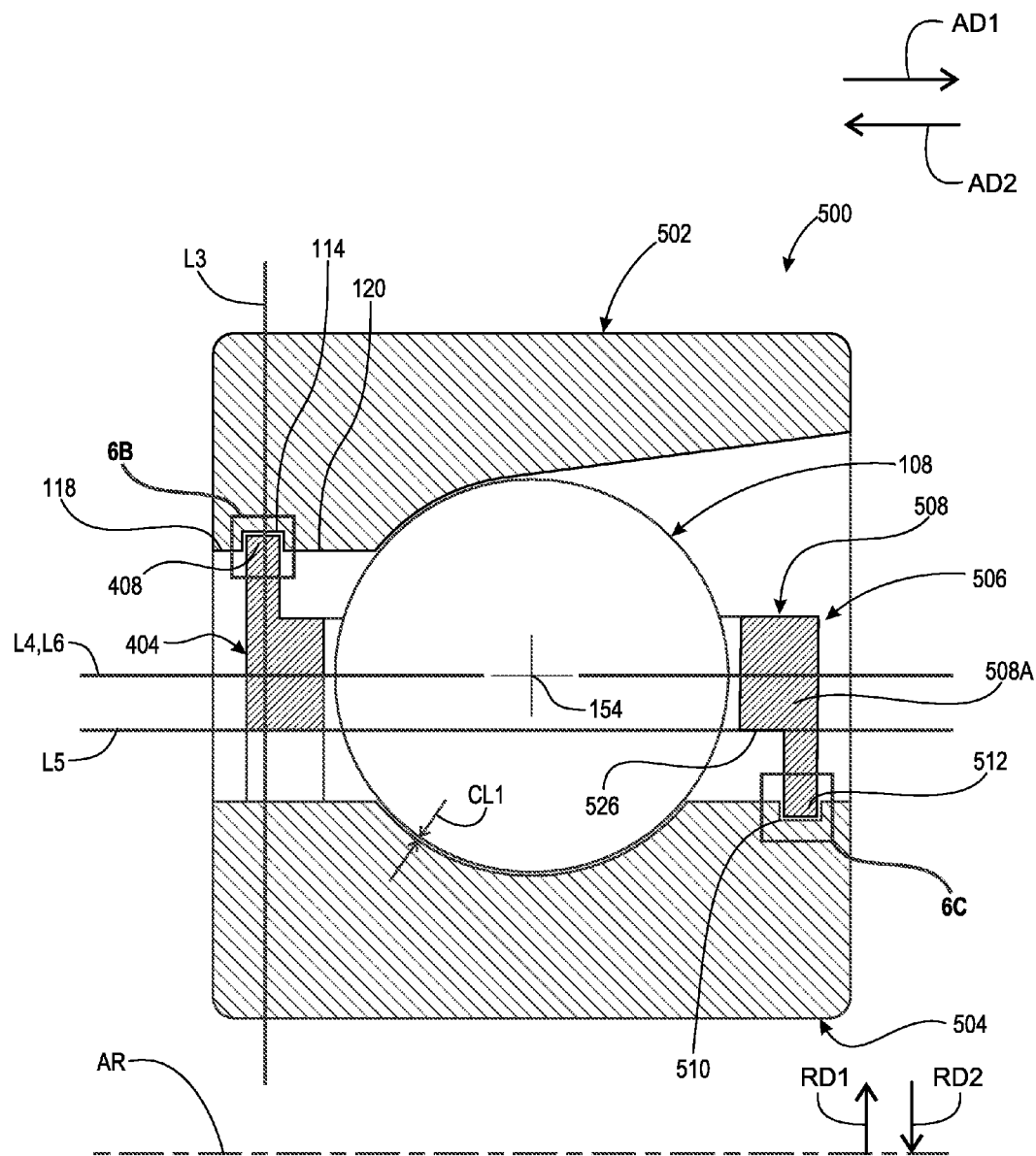
FIG. 6A is a partial cross-sectional view of a ball bearing with a ball-piloted cage having two protrusions.

FIG. 6A is a partial cross-sectional view of ball bearing 500 with a ball-piloted cage having two protrusions.

Figure 6B:
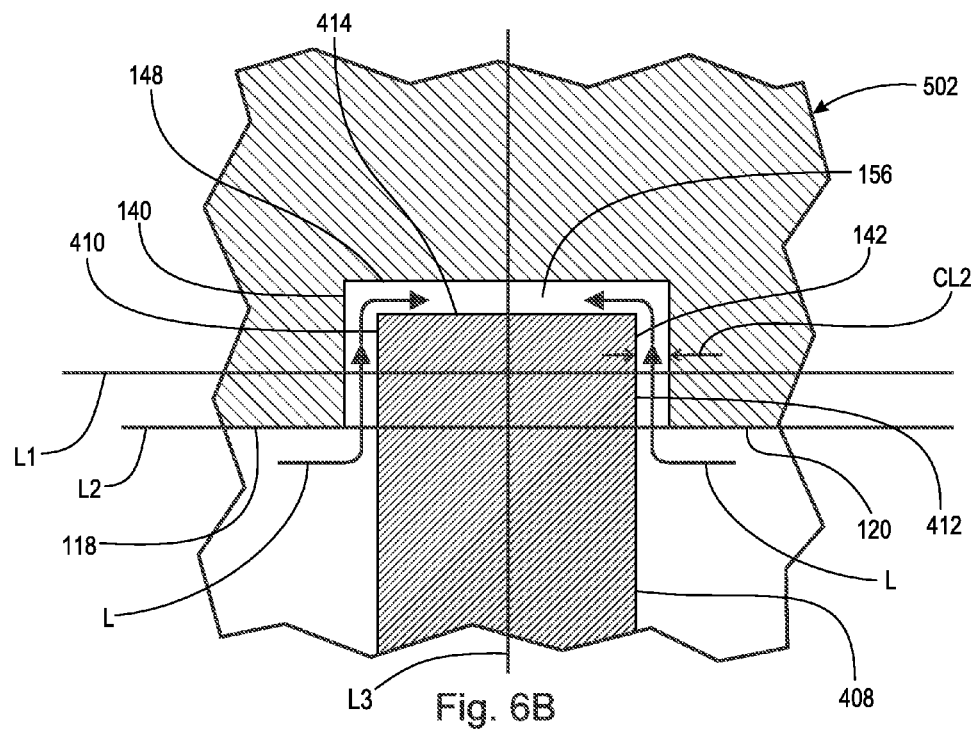
FIG. 6B is a detail of area 6B in FIG. 6A.

FIG. 6B is a detail of area 6B in FIG. 6A.

Figure 6C:
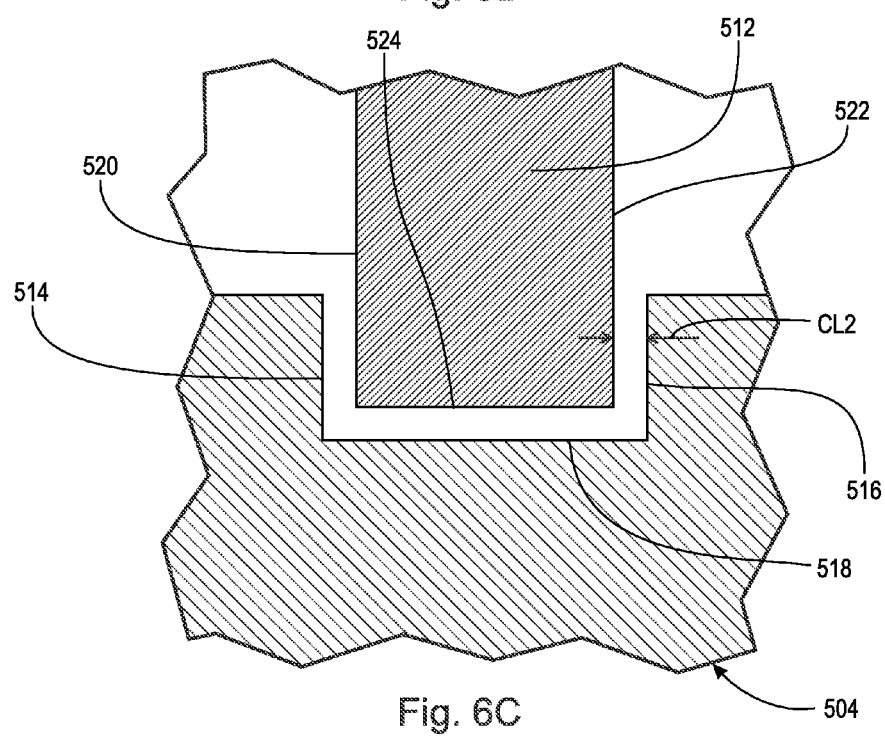
FIG. 6C is a detail of area 6C in FIG. 6A.
Figure 7:
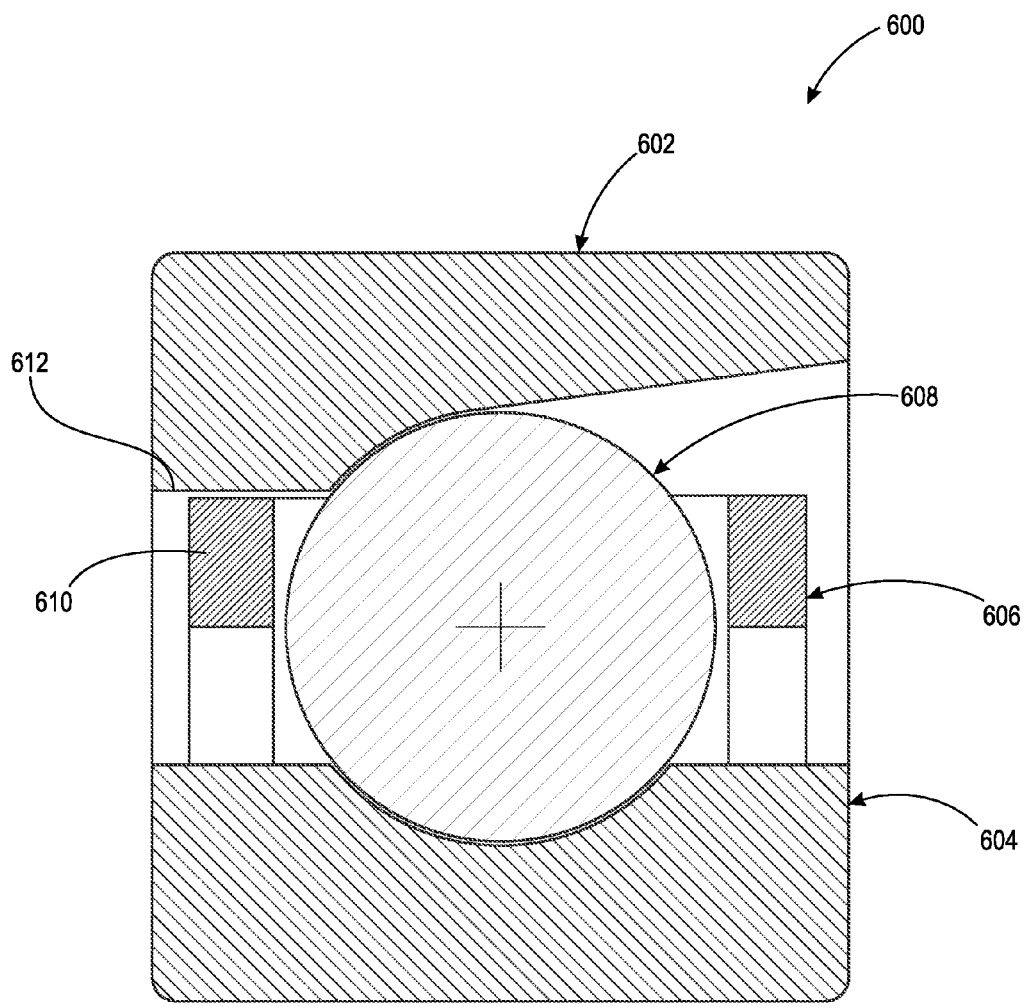
FIG. 7 is a partial cross-sectional view of a prior art ball bearing.

FIG. 6C is a detail of area 6C in FIG. 6A. The following should be viewed in light of FIGS. 2A through 6C. FIG. 6A is a cross-section formed by a plane co-linear with axis AR. Bearing 500 includes outer ring 502, inner ring 504; and ball guided cage 506 radially disposed between rings 502 and 504. Cage 506 includes portions 404 and 508. Ball 108 is axially disposed between portions 404 and 508, and is radially disposed between rings 502 and 504. The description for recess 114 and protrusion 408 in FIGS. 5A and 5B is applicable to recess 114 and protrusion 408 in FIGS. 6A and 6B.

Ring 504 includes recess 510 and portion 508 includes protrusion 512 extending radially inward into recess 510. Recess 510 is bounded by radial walls 514 and 516, and circumferential wall 518, linking walls 514 and 516. Protrusion 512 includes radial walls 520 and 522, and circumferential wall 524, linking walls 520 and 522. It should be understood that other shapes, such as those shown in FIGS. 2A and 2B, or 3A and 3B are possible for recesses 114 and 510, and protrusions 408 and 512 in FIG. 5A. Further, the respective shapes of recess 114 and protrusion 408 do not need to match the respective shapes of recess 510 and protrusion 512. Line L1 passes through, in sequence, walls 140, 410, 412 and 142. Line L3 passes through walls 414 and 148.

The following should be viewed in light of FIGS. 2 through 4B. For bearings 100, 200, and 300, cage 106 is outer ring guided. In an example embodiment, for bearings 100, 200, and 300: Line L4, parallel to axis AR, bisects body portion 110 in radial direction RIM; line L5, parallel to axis AR, is co-linear with or passes through radially inner surface 152 of portion 112; and, line L6, parallel to axis AR, passes through center point 154 of ball 108 and is closer, in radial direction RD1 or RD2 (opposite direction RD1) to line L5 than to line L4. In an example embodiment, lines L5 and L6 are co-linear. Surface 152 faces radially inward in direction RD2 and is the radially innermost surface of portion 112.

The following should be viewed in light of FIGS. 5A and 5B. For bearing 400, cage 406 is ball-guided. In an example embodiment, for bearing 400: Line L4, parallel to axis AR, bisects body portion 406 in radial direction RIM; line L5, parallel to axis AR, is co-linear with or passes through radially inner surface 416 of portion 406; and line L6, parallel to axis AR, passes through center point 154 of ball 108 and is closer, in radial direction RIM or RD2, to line L4 than to line L5. In an example embodiment, lines L4 and L6 are co-linear. Surface 416 faces radially inward in direction RD2 and is the radially innermost surface of portion 406.

The following should be viewed in light of FIGS. 6A through 6C. For bearing 500, cage 506 is ball-guided. In an example embodiment, for bearing 500: Line L4, parallel to axis AR, bisects portion 508A (from which protrusion 512 extends) of body portion 508 in radial direction RD1; line L5, parallel to axis AR, is co-linear with or passes through radially inner surface 526 of portion 508A; and line L6, parallel to axis AR, passes through center point 154 of ball 108 and is closer, in radial direction RIM or RD2, to line L4 than to line L5. In an example embodiment, lines L4 and L6 are co-linear. Surface 526 faces radially inward in direction RD2 and is the radially innermost surface of portion 508A.

The following should be viewed in light of FIGS. 2A through 6C. The following describes a method of reducing rattle in a bearing including: an outer ring, an inner ring located radially inward of the outer ring, a cage located radially between the inner and outer rings, and a ball axially located within the cage. Although the method is presented as a sequence of steps for clarity, no order should be inferred from the sequence unless explicitly stated. A first step rotates one of the inner or outer races with respect to the other of the inner or outer races. A second step engages a wall of a protrusion, extending radially from the cage, with a wall forming a recess in the inner or outer ring. By "engaging" we mean the walls directly contact or there is a layer of fluid/lubricant between the walls. A third step blocks, through the contact of the surface of the protrusion with the surface forming the recess, displacement of the cage with respect to the inner or outer ring. A fourth step blocks, through the engagement of the surface of the protrusion with the surface forming the recess, rocking of the cage with respect to a center point of the ball. A fifth step damps, with lubricant located in a space between the protrusion and the recess, movement of the protrusion within the recess.

Advantageously, bearings 100 through 500 and the method described above resolve the problem of cage rattle. Specifically, bearings 100 through 500 and the method described above resolve the problem of cage rattle due to the clearance between balls in a bearing and a cage in a bearing. Clearance CL1, between ball 108 and inner race 104, has been exaggerated to enable visual representations of clearance CL1. In like manner, clearance CL2 between the various protrusions and recesses in FIGS. 2A, 3A, 4A, 5A, and 6A has been exaggerated to enable visual representations of clearance CL2. In an example embodiment, clearance CL2 is less than or equal to clearance CL1. In an example embodiment, clearance CL2 is less than clearance CL1. Thus, engagement of the respective protrusions and recesses blocks displacement of the respective cages before the respective cages can contact the respective balls, or simultaneously blocks further displacement of the respective cages once initial engagement is made between the respective cages and the respective balls.

Thus, using FIG. 2B as an example, cage 106 in bearing 100 displaces by clearance CL2 so that protrusion 114 engages surface 124 or 126 before or just as cage 106 displaces by clearance CL1 between cage 106 and ball 108. As noted above, unrestricted displacement of cage 106 by clearance CL1 between cage 106 and ball 108 would be a cause of cage rattle in bearing 100.

In addition, clearance CL2 provides a space into which lubricants for bearings 100 through 500 can flow. For example, lubricant L flows into space 156 between respective recesses and protrusions due at least to centrifugal force when bearing 100 through 500 are rotating. Lubricant L provides damping between the respective protrusions 116 and the surfaces forming the respective recesses, lessening any noise that might be associated with the engagement of the respective protrusions with the surfaces forming the respective recesses. The lubricant prevents direct contact of the respective protrusions with the surfaces forming the respective recesses or reduces the force of impact between the respective protrusions and the surfaces forming the respective recesses.

In an example embodiment (not shown), any or all of bearings 100, 200, 300, 400 and 500 are roller bearings. That is, instead of ball 108, the bearing(s) include a roller.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A bearing, comprising:
   an axis of rotation;
   an outer ring;
   an inner ring located radially inward of the outer ring;
   a cage;
   a ball disposed in the cage; and,
   a clearance between the cage and the ball,
      wherein:
         the outer ring includes a first recess and the cage includes a first protrusion located in the first recess; and,
         the clearance between the cage and the ball is greater than or equal to a clearance between the first protrusion and the first recess; or,
      wherein:
         the inner ring includes a second recess and the cage includes a second protrusion located in the second recess; and,
         the clearance between the cage and the ball is greater than or equal to a clearance between the second protrusion and the second recess.

2. The bearing of claim 1, wherein:
   the outer ring includes the first recess and the cage includes the first protrusion;
   the bearing cage includes first and second body portions;

the ball is axially disposed between the first and second body portions; and, the first protrusion extends radially outward from the first body portion.

3. The bearing of claim 1, wherein:
the outer ring includes the first recess and the cage includes the first protrusion;
the outer ring includes first and second surfaces facing radially inward; and,
a line parallel to the axis of rotation:
   is co-linear with the first and second surfaces; and,
   passes through the first protrusion.

4. The bearing of claim 1, wherein:
the outer ring includes the first recess and the cage includes the first protrusion;
the first recess is formed by:
   a first wall slanting in a first axial direction; and,
   a second wall slanting in a second axial direction, opposite the first axial direction; and,
the first protrusion is formed by:
   a third wall slanting in the first axial direction; and,
   a fourth wall slanting in the second axial direction.

5. The bearing of claim 4, wherein a line parallel to the axis of rotation passes through in sequence:
the first wall for the first recess;
the third wall for the first protrusion;
the fourth wall for the first protrusion; and,
the second wall for the first recess.

6. The bearing of claim 1, wherein:
the outer ring includes the first recess and the cage includes the first protrusion;
the first recess is bounded by a rounded wall defined by a single smooth curve;
the first protrusion includes a rounded wall defined by a single smooth curve; and,
the rounded wall for the first protrusion is matingly engaged with the rounded wall bounding the first recess.

7. The bearing of claim 1, wherein:
the outer ring includes the first recess and the cage includes the first protrusion;
the first recess is formed, in part, by first and second walls orthogonal to the axis of rotation;
the first protrusion includes third and fourth walls orthogonal to the axis of rotation; and,
a line parallel to the axis of rotation passes through the first and second walls for the first recess and the third and fourth walls for the first protrusion.

8. The bearing of claim 1, wherein:
the inner ring includes the second recess and the cage includes the second protrusion;
the cage includes first and second body portions;
the ball is axially disposed between the first and second body portions; and,
the second protrusion extends radially inward from the first body portion.

9. The bearing of claim 1, wherein:
the outer ring includes the first recess and the cage includes the first protrusion;
the inner ring includes the second recess and the cage includes the second protrusion; and,
the cage includes first and second body portions;
the ball is axially disposed between the first and second body portions;
the first body portion includes the first protrusion located in the first recess; and,
the second body portion includes the second protrusion located in the second recess.

10. The bearing of claim 1, wherein:
the outer ring includes the first recess and the cage includes the first protrusion;
the cage includes first and second body portions;
the first protrusion extends radially outward from the first body portion;
the ball is axially disposed between the first and second body portions;
a first line, parallel to the axis of rotation, bisects the second body portion in a radially outward direction;
a second line, parallel to the axis of rotation, is co-linear with, or passes through, a surface of the second body portion facing radially inward; and,
   a third line, parallel to the axis of rotation, passes through a center point of the ball and is closer, in the radially outward direction, to the first line than to the second line; or,
   a third line, parallel to the axis of rotation, passes through a center point of the ball and is closer, in the radially outward direction, to the second line than to the first line.

11. The bearing of claim 1, wherein the outer ring includes the first recess and the cage includes the first protrusion, the bearing further comprising:
a space between the first recess and the first protrusion; and,
first lubricant located in the space.

12. A ball bearing, comprising:
an axis of rotation;
an outer ring including a recess;
an inner ring located radially inward of the outer ring;
a ball bearing cage radially disposed between the inner and outer rings and including:
   a first body portion including a protrusion extending radially outward into the recess; and,
   a second body portion;
a ball axially disposed between the first and second body portions;
a clearance between the cage and the ball; and,
a clearance between the protrusion and the recess, wherein the clearance between the cage and the ball is greater than or equal to the clearance between the protrusion and the recess.

13. The ball bearing of claim 12, wherein:
the recess is formed by:
   a first wall slanting in a first axial direction; and,
   a second wall slanting in a second axial direction, opposite the first axial direction; and,
the protrusion is formed by:
   a third wall slanting in the first axial direction; and,
   a fourth wall slanting in the second axial direction.

14. The ball bearing of claim 12, wherein:
the recess is bounded by a rounded wall formed by a single smooth curve;
the protrusion includes a rounded wall formed by a single smooth curve; and,
the rounded wall for the protrusion is matingly engaged with the rounded wall bounding the recess.

15. The ball bearing of claim 12, wherein:
the recess is formed, in part, by first and second walls orthogonal to the axis of rotation;
the protrusion is formed, in part, by third and fourth walls orthogonal to the axis of rotation; and, a line parallel to the axis of rotation passes through the first and second walls for the recess and the third and fourth walls for the protrusion.

16. The ball bearing of claim 12, wherein:

a first line, parallel to the axis of rotation, bisects the second body portion in a radially outward direction;

a second line, parallel to the axis of rotation, is co-linear with, or passes through, a radially innermost surface of the second body; and,

- a third line, parallel to the axis of rotation, passes through a center point of the ball and is closer, in the radially outward direction, to the first line than to the second line; or,
- a third line, parallel to the axis of rotation, passes through a center point of the ball and is closer, in the radially outward direction, to the second line than to the first line.

17. A method of reducing rattle in a bearing including an outer ring, an inner ring located radially inward of the outer ring, a cage located radially between the inner and outer rings, and a ball axially located within the cage, comprising:

rotating one of the inner or outer races with respect to the other or the inner or outer races;

engaging a wall of a protrusion, extending radially from the cage, with a wall forming a recess in the inner or outer ring; and, blocking, through the engagement of the wall of the protrusion with the wall forming the recess:

displacement of the cage with respect to the inner or outer ring; and, contact of the cage with the ball.

18. The method of claim 17, further comprising:

blocking, through the engagement of the wall of the protrusion with the wall forming the recess, rocking of the cage with respect to a center point of the ball.

19. The method of claim 17, further comprising:

damping, with lubricant located in a space between the protrusion and the recess, movement of the protrusion within the recess.

* * * * *